(12) United States Patent
Patton

(10) Patent No.: US 9,775,338 B2
(45) Date of Patent: Oct. 3, 2017

(54) TURKEY CALL DEVICE

(71) Applicant: Floyd Arnold Patton, Stringtown, OK (US)

(72) Inventor: Floyd Arnold Patton, Stringtown, OK (US)

( * ) Notice: Subject to any disclaimer, the term of this patent is extended or adjusted under 35 U.S.C. 154(b) by 0 days.

(21) Appl. No.: 15/226,563

(22) Filed: Aug. 2, 2016

(65) Prior Publication Data

US 2016/0338339 A1 Nov. 24, 2016

Related U.S. Application Data

(63) Continuation of application No. 14/836,715, filed on Aug. 26, 2015, now abandoned.

(60) Provisional application No. 62/052,634, filed on Sep. 19, 2014.

(51) Int. Cl.
*A63H 5/00* (2006.01)
*A01M 31/00* (2006.01)

(52) U.S. Cl.
CPC .................................. *A01M 31/004* (2013.01)

(58) Field of Classification Search
CPC ............................... A01M 31/004; A63H 5/00
USPC .................................................. 446/397, 418
See application file for complete search history.

(56) References Cited

U.S. PATENT DOCUMENTS

| | | | | |
|---|---|---|---|---|
| 3,927,490 A * | 12/1975 | Grayson | ................... | A63H 5/00 446/397 |
| 4,003,159 A * | 1/1977 | Piper | ................... | A01M 31/004 446/397 |
| 4,586,912 A * | 5/1986 | Adams | ..................... | A63H 5/00 446/397 |
| 4,648,852 A * | 3/1987 | Wingate | .............. | A01M 31/004 446/397 |
| 4,662,858 A * | 5/1987 | Hall | ..................... | A01M 31/004 446/397 |
| 5,178,575 A * | 1/1993 | Koch | ................... | A01M 31/004 446/170 |
| 6,159,068 A * | 12/2000 | Trotter | ................ | A01M 31/004 446/188 |
| 6,264,527 B1 * | 7/2001 | Sabol, Jr. | ............ | A01M 31/004 446/397 |
| 2010/0151769 A1 * | 6/2010 | Coffield | .............. | A01M 31/004 446/418 |
| 2010/0178843 A1 * | 7/2010 | Peel | ..................... | A01M 31/004 446/397 |
| 2011/0065356 A1 * | 3/2011 | Blodgett | ............. | A01M 31/004 446/397 |

* cited by examiner

*Primary Examiner* — Vishu Mendiratta
(74) *Attorney, Agent, or Firm* — D. Ward Hobson

(57) ABSTRACT

A turkey call device and assembly for simulating multiple calls of a wild turkey hen. The turkey call device and assembly comprises a housing with a plurality of striker plates and at least one striker member. In one embodiment, the housing comprises two striker plates on the top thereof and a third striker plate on the bottom thereof. The bottom striker plate is capable of producing a locator call. The locator call has a hearing range of up to one half of a mile so as to eliminate the need for a user to travel long distances for the device to be heard from afar. Each striker plate and striker member can be formed from different materials. In this way, the turkey call device and assembly enables a user to reproduce multiple sounds, such as yelps, cuts, cackles, kee kees, runs, purrs, clucks, and other turkey hen sounds.

12 Claims, 5 Drawing Sheets

TURKEY CALL DEVICE

CROSS-REFERENCE TO RELATED APPLICATIONS

This application is a continuation of U.S. application Ser. No. 14/836,715 filed on Aug. 26, 2015, which claims the benefit of U.S. Provisional Application No. 62/052,634 filed on Sep. 19, 2014.

BACKGROUND

Bird calling devices are used by outdoor enthusiasts, hunters, nature lovers, and other persons to mimic bird calls and to attract live birds toward a person. Generally, bird calling devices comprise a box structure with a striker block or a surface that can generate a sound that mimics a bird call. However, conventional bird calling devices are generally limited to making a single type of bird call, and thus serve a limited purpose.

To that end it would be advantageous to provide an improved turkey call device and assembly configured to simulate multiple calls of a wild turkey hen to attract turkeys to a person while hunting. The improved turkey call device and assembly comprises a housing with a plurality of striker plates thereon and at least one striker member for producing various types of turkey calls, and in particular, hen sounds.

In some embodiments, the housing comprises one striker plate on the top thereof and one striker plate on the bottom thereof. While, in some embodiments, the housing comprises two or three striker plates on the top thereof and one striker plate on the bottom thereof. The striker plate on the bottom of the housing is capable of producing a locator call. The locator call has a hearing range of up to one half of a mile so as to eliminate the need for the user to travel long distances for the device to be heard from afar. Each striker plate and striker member can be formed from different materials, such as aluminum slate, acrylic slate, and wood, for example, whereby using a different striker member to strike each striker plate produces a different sound. In this way, the improved turkey call device and assembly enables a user to reproduce multiple turkey call sounds, such as yelps, cuts, cackles, kee kees, runs, purrs, clucks, and other turkey hen sounds.

BRIEF DESCRIPTION OF THE SEVERAL VIEWS OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION OF EXEMPLARY EMBODIMENTS

Figure 1:
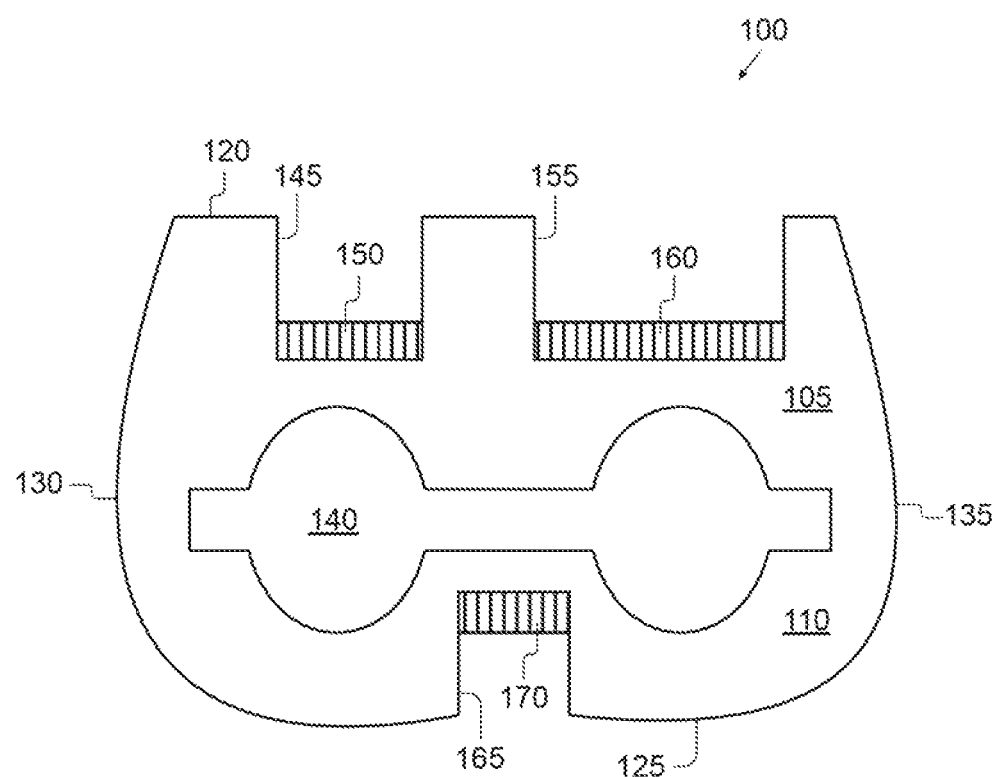
FIG. 1 is a front planar view of an exemplary embodiment of a turkey call device according to the inventive concepts disclosed herein.

Before explaining at least one embodiment of the inventive concepts disclosed herein in detail, it is to be understood that the inventive concepts are not limited in their application to the details of construction and the arrangements of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed.

If used herein the notation "a-n" appended to a reference numeral is intended as merely convenient shorthand to reference one, or more than one, and up to infinity, of the element or feature identified by the respective reference numeral (e.g., 100a-n). Similarly, a letter following a reference numeral is intended to reference an embodiment of the feature or element that may be similar, but not necessarily identical, to a previously described element or feature bearing the same reference numeral (e.g., 110, 110a, 110b, etc.). Such shorthand notations are used for purposes of clarity and convenience only, and should not be construed to limit the instant inventive concept(s) in any way, unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed herein are generally directed to a turkey call device comprising a housing having an open front, open back, a top, bottom, and first and second sides extending therebetween. The turkey call device includes an acoustic chamber positioned within the housing that extends between the open front and open back of the housing. The housing includes a plurality of recessed grooves located on the top and bottom of the housing. In some embodiments, the housing may include one recessed groove positioned on the top of the housing and one recessed groove positioned on the bottom of the housing. In some embodiments, the housing may include one recessed groove positioned on the bottom of the housing and two or more recessed grooves positioned on the top of the housing. The recessed grooves extend between the open front and open back of the housing. Each recessed groove is configured to hold a striker plate therein. Each striker plate may be formed from a slate of aluminum, acrylic, or stone, for example, so as to be capable of producing different turkey call sounds.

Figure 2:
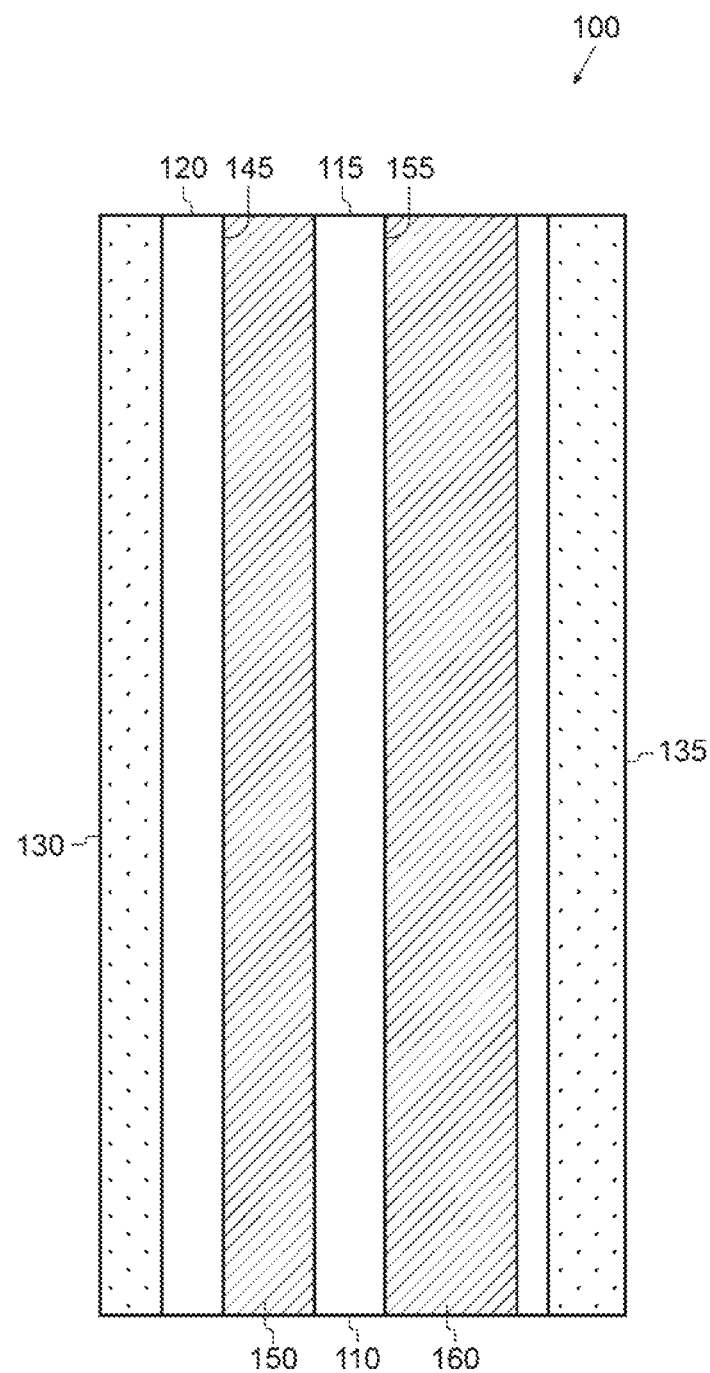
FIG. 2 is a top planar view of an embodiment of a turkey call device according to the inventive concepts disclosed herein.
Figure 3:
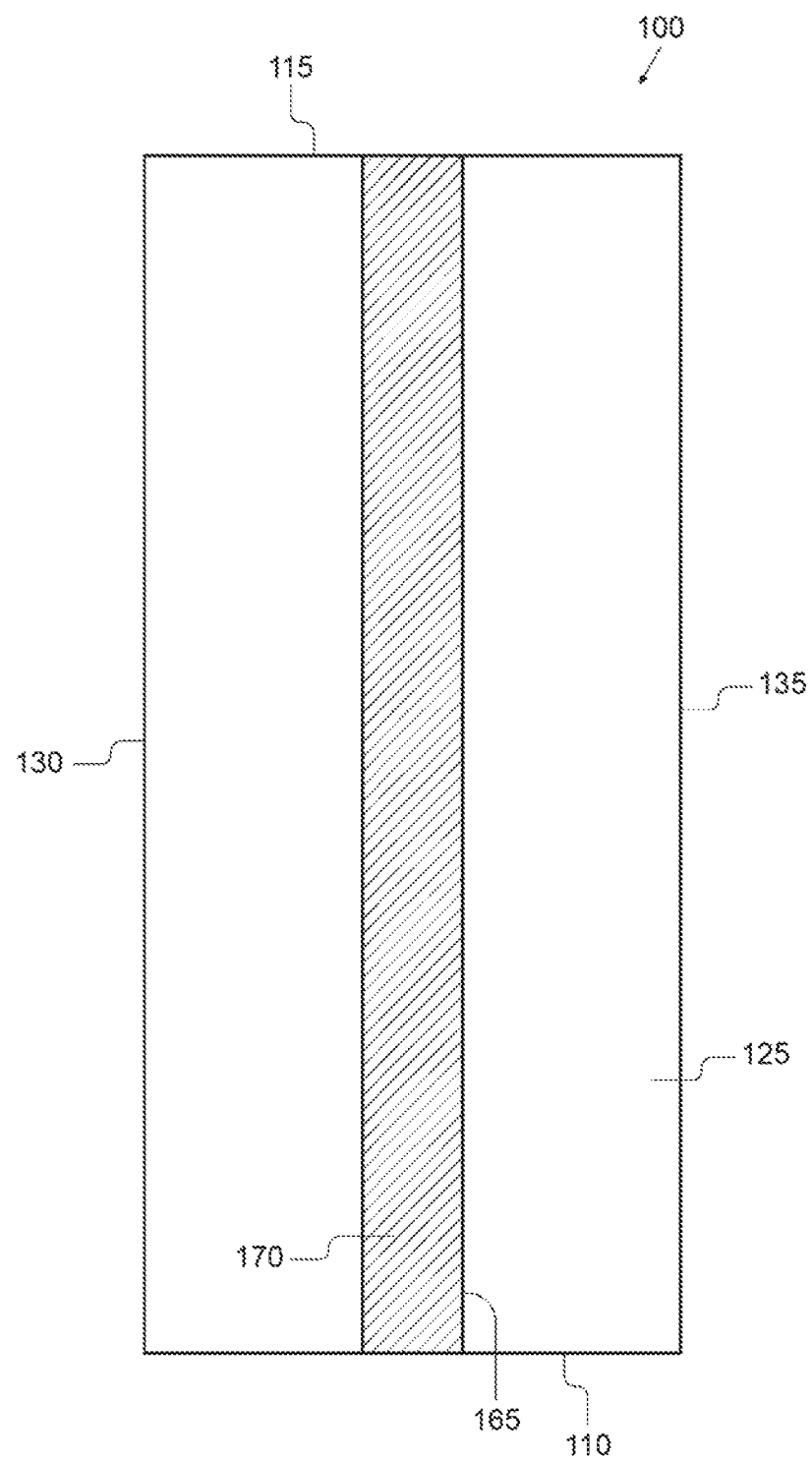
FIG. 3 is a bottom planar view of an embodiment of a turkey call device according to the inventive concepts disclosed herein.

Referring now to FIGS. 1-3, shown therein is an exemplary embodiment of a turkey call device 100. The turkey call device 100 includes a housing 105 having an open front 110, an open back 115, a top 120, a bottom 125, and first and second sides (130 and 135) extending there between. The turkey call device 100 includes an acoustic chamber 140 positioned within the housing 105 that extends vertically between the open front 110 and open back 115 of the housing 105. The turkey call device 100 further includes a first recessed groove 145 located on the top 120 of the housing 105 and configured to hold a first striker plate 150 therein. The first recessed groove 145 extends vertically between the open front 110 and open back 115 of the housing 105. The turkey call device 100 further includes a second recessed groove 165 located on the bottom 125 of the housing 105. The second recessed groove 165 is configured to hold a second striker plate 170 therein. The second recessed groove 165 extends vertically between the open front 110 and open back 115 of the housing 105.

In some embodiments, the turkey call device 100 further includes a third recessed groove 155 located on the top 120 of the housing 105 and configured to hold a third striker plate 160 therein. The third recessed groove 155 extends vertically between the open front 110 and open back 115 of the housing 105 and is positioned parallel to the first recessed groove 145. Similarly, in some embodiments, the turkey call device 100 may also include a fourth recessed groove located on the top of the housing and a fourth striker plate positioned within the fourth recessed groove. The fourth recessed groove extending vertically between the open front and open back of the housing and positioned parallel to the first and second recessed groove.

The housing 105 includes an open front 110, an open back 115, a top 120, a bottom 125, and first and second sides (130 and 135) extending therebetween. The housing 105 may be constructed of any desired material, including but not limited to, wood, maple wood, acrylic, plastics, metals, alloys, non-metals, steel, titanium, carbon fiber, polymers, resins, ceramics, composite materials, or combinations thereof. In some embodiments the housing 105 may be elongated and generally rectangular in shape, while in some embodiments the housing 105 may be substantially square or may have any other desired shape, as will be appreciated by persons of ordinary skill in the art having the benefit of the instant disclosure. Further, embodiments of the housing 105 may include reinforcing or bracing structures, such as ribs, struts, braces, rods, or any other suitable reinforcing structure, or combinations thereof. In some embodiments, the housing 105 of the turkey call device 100 is tapered. For example, the open front 110 and open back 115 of the housing 105 may be tapered from the top 120 of the housing 105 to the bottom 125 of the housing 105, so that the top 120 of the housing 105 is more narrow than the bottom 125 of the housing 105. In this way, the housing 105 may be more easily held and used by a person.

The turkey call device 100 further includes an acoustic chamber 140 positioned within the housing 105 and extending vertically between the open front 110 and open back 115 of the housing 105. The acoustic chamber 140 is a hollow open ended resonance chamber formed within the housing 105 that allows the resonant oscillation of sound waves. The dimensions and position of the acoustic chamber 140 amplify the sound produced by the turkey call device 100 when in use. For example, when a striker member is rubbed across a striker plate of the turkey call device 100, the resulting vibration produces a unique sound, similar to that of a turkey, which is amplified by the acoustic chamber 140.

The turkey call device 100 further includes a first recessed groove 145 located on the top 120 of the housing 105 that is configured to hold a first striker plate 150 therein. The first recessed groove 145 extends vertically between the open front 110 and open back 115 of the housing 105. The first recessed groove 145 is formed within the housing 105 to hold a first striker plate 150. The depth of the first recessed groove 145 is greater than the depth of the first striker plate 150 so that the first striker plate is recessed within the first recessed groove 145.

The first recessed groove 145 is generally rectangular in shape. However, it is to be understood that the first recessed groove 145 may have any desired shape configured to matingly receive a first striker plate 150 therein such that the first striker plate 150 is substantially below or flush with the housing 105. In some embodiments, the first recessed groove 145 may be generally rectangular in shape. While in some embodiments the first recessed groove 145 may be substantially square, circular, or triangular, in shape.

The first striker plate 150 is held by and attached to the first recessed groove 145. The first striker plate 150 is generally rectangular in shape. However, it is to be understood that the first striker plate 150 may have any desired shape configured to matingly rest or attach to the first recessed groove 145 therein such that the first striker plate 150 is substantially below or substantially flush with the housing 105. In some embodiments, the first striker plate 150 may be generally rectangular in shape. While in some embodiments the first striker plate 150 may be substantially square, circular, or triangular in shape so as to attach and fit within the shape of the first recessed groove 145.

Further, the first striker plate 150 may have any desired thickness sufficient to create the desired turkey call sound. Variations in thickness of the first striker plate 150 result in the first striker plate 150 producing different turkey call sounds, as will be appreciated by persons of ordinary skill in the art having the benefit of the instant disclosure.

The first striker plate 150 may be attached to or rest within the first recessed groove 145 using fasteners, adhesives, Velcro, glues, combinations thereof, and the like. In some embodiments, the first striker plate 150 and the first recessed groove 145 may be formed as a unitary body, such as via casting, machining, molding, or any other desired method or technique.

The first striker plate 150 is configured to produce a turkey call sound by rubbing a striker member across the first striker plate 150. In this way, the vibration between the first striker plate and the striker member create sound, which mimics the sound of a turkey call, and which is amplified by the acoustic chamber 140 of the turkey call device 100. The first striker plate 150 is preferably formed from aluminum slate, but may be formed from any suitable material sufficient to produce a turkey call sound upon rubbing the first striker plate 150 with a striker member. For example, the first striker plate 150 may be formed from stone, aluminum slate, aluminum, slate, acrylic, wood, plastic, composites, combinations thereof and the like. Further, in some embodiments, if the first striker plate 150 becomes worn, a user may remove and replace the first striker plate 150 with a new first striker plate 150, either formed from the same material or from a different material. In this way, the turkey call device 100 can create many different turkey calls. For example, a user may change the first striker plate 150 and replace it with another first striker plate 150 formed from a different material, in the event the first striker plate 150 becomes worn or in the event the user desires to create a different turkey call sound.

The turkey call device 100 further includes a second recessed groove 165 located on the bottom 125 of the housing 105 and configured to hold a second striker plate 170 therein. The second recessed groove 165 extends vertically along the bottom 125 of the housing 105 between the open front 110 and open back 115 of the housing 105. The second recessed groove 165 and the second striker plate 170 operate similarly to the first recessed groove 145 and first striker plate 150. However, the second recessed groove 165 and second striker plate 170 are centrally located along the bottom of housing 105. The second striker plate 170 is configured to produce turkey call sounds and in particular a locator call. The locator call has a hearing range of up to one half of a mile so as to eliminate the need for the user to travel long distances for the device to be heard from afar. The second recessed groove 165 and second striker plate 170 are used in combination with the first recessed groove 145 and first striker plate 150 to produce different turkey call sounds.

In some embodiments, the first recessed groove 145 and second recessed groove 165 are of different dimensions. In this way, the turkey call device 100 is able to produce multiple turkey call sounds. While the second recessed groove 165 is preferably positioned centrally on the bottom 125 of the housing 105, it should be understood that the position of the second recessed groove 165 may vary, depending upon the desired shape and configuration of the turkey call device 100, as will be appreciated by persons of ordinary skill in the art having the benefit of the instant disclosure.

The second recessed groove 165 is formed within the housing 105 to hold a second striker plate 170. The second recessed groove 165 is generally rectangular in shape. However, it is to be understood that the second recessed groove 165 may have any desired shape configured to matingly receive a second striker plate 170 therein such that the second striker plate 170 is substantially below or flush with the bottom 125 of the housing 105. In some embodiments, the second recessed groove 165 spans the height of the housing 105. In some embodiments, the second recessed groove 165 may be generally rectangular in shape. While in some embodiments the second recessed groove 165 may be substantially square, circular, or triangular, in shape.

The second striker plate 170 is held by and attached to the second recessed groove 165. The depth of the second recessed groove 165 is greater than the depth of the second striker plate 170 so that the second striker plate 170 is recessed within the second recessed groove 165. The second striker plate 170 is generally rectangular in shape. It is to be understood that the second striker plate 170 may have any desired shape configured to matingly rest or attach to the second recessed groove 165 therein such that the second striker plate 170 is substantially below or substantially flush with the bottom 125 of the housing 105.

In some embodiments, the second striker plate 170 may be generally rectangular in shape. While in some embodiments the second striker plate 170 may be substantially square, circular, or triangular in shape so as to attach and fit within the shape of the second recessed groove 165. Additionally, in some embodiments, each of the first recessed groove 145 and second recessed groove 165, comprise a rectangular cross section. In this way, the first striker plate 150 and second striker plate 170, rest flush against the first recessed groove 145 and second recessed groove 165, respectively.

The second striker plate 170 may have any desired thickness sufficient to create the desired turkey call sound. Variations in thickness between the first striker plate 150 and second striker plate 170 allow the turkey call device 100 to produce different turkey call sounds, as will be appreciated by persons of ordinary skill in the art having the benefit of the instant disclosure. In some embodiments, for example, the first striker plate 150 is greater in width than the second striker plate 170, thereby allowing the third second plate 170 to produce different sounds than the first striker plate 150.

The second striker plate 170 may be attached to or rest within the second recessed groove 165 using fasteners, adhesives, Velcro, glues, combinations thereof, and the like. In some embodiments, the second striker plate 170 and the second recessed groove 165 may be formed as a unitary body, such as via casting, machining, molding, or any other desired method or technique.

The second striker plate 170 is configured to produce a turkey call sound upon rubbing a striker member across the second striker plate 170. In this way, the vibration created between the second striker plate 170 and the striker member create sound, which mimics the sound of a turkey call, and which is amplified by the acoustic chamber 140 of the turkey call device 100. The second striker plate 170 is preferably formed from aluminum slate, but may be formed from any suitable material sufficient to produce a turkey call sound upon rubbing the second striker plate 170 with a striker. For example, the second striker plate 170 may be formed from stone, aluminum slate, aluminum, slate, acrylic, wood, plastic, composites, combinations thereof and the like. Further, in some embodiments, the second striker plate 170 may be selectively removed and replaced with a new second striker plate 170, either formed form the same or from a different material. In this way, the turkey call device 100 can create many different turkey calls, by varying or replacing the second striker plate 170. For example, a user may remove and replace the second striker plate 170 with another second striker plate 170 if the second striker plate 170 becomes worn or if the user desires to the turkey call device 100 to produce a different turkey call sound.

In some embodiments, the turkey call device 100 further includes a third recessed groove 155 located on the top 120 of the housing 105 and configured to hold a third striker plate 160 therein. The third recessed groove 155 and the third striker plate 160 operate similarly to the first recessed groove 145 and first striker plate 150. The third recessed groove 155 extends vertically between the open front 110 and open back 115 of the housing 105 and is positioned parallel or in a side by side orientation to the first recessed groove 145 such that the first recessed groove 145 and third recessed groove 155 are separated by a portion of the housing 105. In some embodiments, the first striker plate 150 and third striker plate 160 span the height of the housing 105. Further, in some embodiments, the third striker plate 160 is greater in width than the first striker plate 150, thereby allowing the first striker plate 150 to produce different sounds from the third striker plate 160.

While the third recessed groove 155 is preferably positioned parallel to the first recessed groove 145, it should be understood that the position of the third recessed groove 155 may vary, depending upon the desired shape and configuration of the turkey call device 100, as will be appreciated by persons of ordinary skill in the art having the benefit of the instant disclosure.

The third recessed groove 155 is formed within the housing 105 to hold a third striker plate 160. The depth of the third recessed groove 155 is greater than the depth of the third striker plate 160 so that the third striker plate 160 is recessed within the third recessed groove 155. The third recessed groove 155 is generally rectangular in shape. However, it is to be understood that the third recessed groove 155 may have any desired shape configured to matingly receive a third striker plate 160 therein such that the third striker plate 160 is substantially below or flush with the housing 105. In some embodiments, the third recessed groove 155 may be generally rectangular in shape. While in some embodiments the third recessed groove 155 may be substantially square, circular, or triangular, in shape.

The third striker plate 160 is held by and attached to the third recessed groove 155. The third striker plate 160 is generally rectangular in shape. However, it is to be understood that the third striker plate 160 may have any desired shape configured to matingly rest or attach to the third recessed groove 155 therein such that the third striker plate 160 is substantially below or substantially flush with the housing 105. In some embodiments, the third striker plate 160 may be generally rectangular in shape. While in some embodiments the third striker plate 160 may be substantially square, circular, or triangular in shape so as to attach and fit within the shape of the third recessed groove 155.

Further, the third striker plate 160 may have any desired thickness sufficient to create the desired turkey call sound. Variations in thickness of the third striker plate 160 with the first striker plate 150 result in the turkey call device 100 producing different turkey call sounds, as will be appreciated by persons of ordinary skill in the art having the benefit of the instant disclosure.

The third striker plate 160 may be attached to or rest within the third recessed groove 155 using fasteners, adhesives, Velcro, glues, combinations thereof, and the like. In some embodiments, the third striker plate 160 and the third recessed groove 155 may be formed as a unitary body, such as via casting, machining, molding, or any other desired method or technique.

The third striker plate 160 is configured to produce a turkey call sound upon rubbing a striker member across the third striker plate 160. In this way, the resulting vibrations produce sound, which mimic the sound of a turkey call, and which are amplified by the acoustic chamber 140 of the turkey call device 100. The third striker plate 160 is preferably formed from acrylic, but may be formed from any suitable material sufficient to produce a turkey call sound upon rubbing the second striker plate 160 with a striker member.

For example, the third striker plate 160 may be formed from stone, acrylic, aluminum slate, acrylic slate, aluminum, slate, wood, plastic, composites, combinations thereof and the like. Further, in some embodiments, the third striker plate 160 may be selectively removed and replaced with a new third striker plate 160, either formed form the same or from a different material. In this way, the turkey call device 100 can create many different turkey calls, by varying or replacing the material of the third striker plate 160. For example, a user may change and replace the third striker plate 160 with another third striker plate 160 formed from a different material if the third striker plate 160 becomes worn or if the user desires to create a different turkey call sound.

Figure 5:
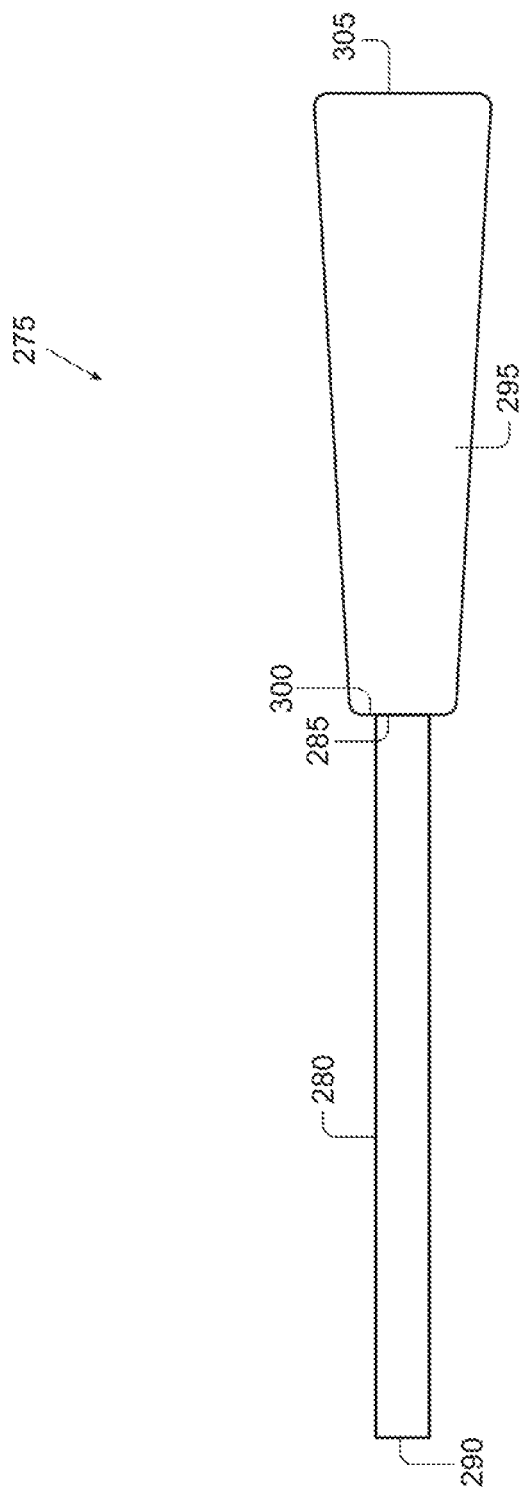
FIG. 5 is a perspective view of an embodiment of a striker member of a turkey call assembly according to the inventive concepts disclosed herein.

In operation, the housing 105 of the turkey call device 100 is held in a user's non-dominant hand, while a striker member 275 (as shown in FIG. 5) is held in the user's dominant hand, so that the striker member 275 is held similarly to a writing utensil. The striker member 275 can then be drawn towards or rubbed across the first striker plate 150, third striker plate 160, or second striker plate 170. For example, a striker member 275 formed cherry wood can be used with each of the first striker plate 150, third striker plate 160, or second striker plate 170, to produce sounds that mimic turkey sounds, and more specifically, turkey hen sounds. While, a striker member 275 formed from walnut wood can also be used with each of the first striker plate 150, third striker plate 160, or second striker plate 170, to produce sounds that mimic turkey sounds, and more specifically, turkey hen sounds. In this way, the turkey call device 100 can produce at least six different types of hen sounds.

Figure 4:
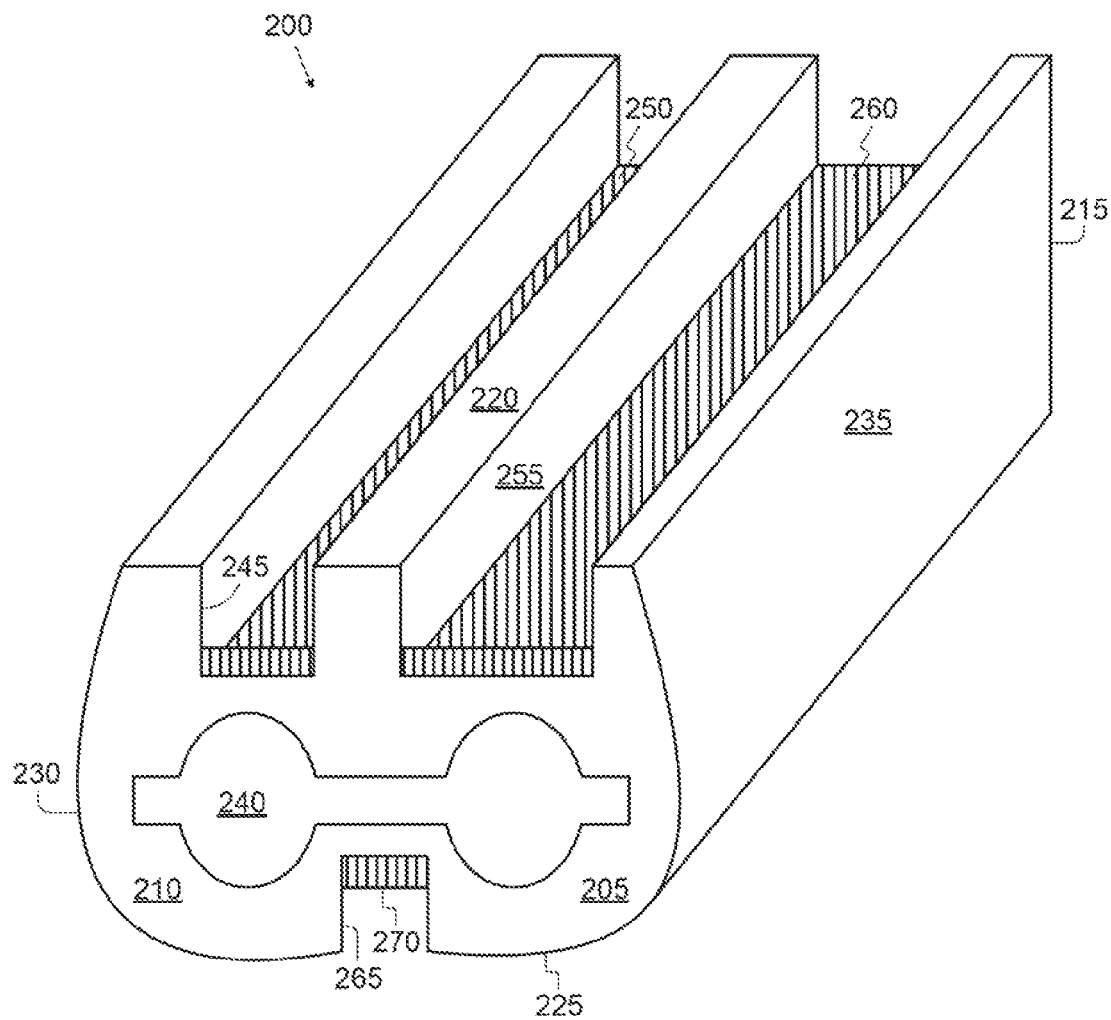
FIG. 4 is a perspective view of an embodiment of a turkey call assembly according to the inventive concepts disclosed herein

Referring now to FIGS. 4-5, shown therein a turkey call assembly 200. The turkey call assembly 200 is implemented similarly to the turkey call device 100 and further includes a striker member 275 as shown in FIG. 5. In some embodiments, the turkey call assembly 200 may include a first recessed groove and first striker plate located on the top of the housing and a second recessed groove and second striker plate located on the bottom of the housing. While in some embodiments, the turkey call assembly 200 may also include a third recessed groove and third striker plate located on the top of the housing and a fourth recessed groove and fourth striker plate also located on the top of the housing. In some embodiments, the first recessed groove, third recessed groove, and fourth recessed groove may be positioned in a side by side or parallel orientation along the top of the housing.

As shown in FIGS. 4-5, the turkey call assembly 200 includes a housing 205 having an open front 210, an open back 215, a top 220, a bottom 225, and first and second sides (230 and 235) extending therebetween. The turkey call assembly 200 includes an acoustic chamber 240 positioned within the housing 205 that extends vertically between the open front 210 and open back 215 of the housing 205. The turkey call assembly 200 includes a first recessed groove 245 located on the top 220 of the housing 205 and that extends vertically between the open front 210 and open back 215 of the housing 205 and an aluminum slate first striker plate 250 positioned within the first recessed groove 245.

The turkey call assembly 200 further includes a second recessed groove 265 located on the bottom 225 of the housing 205. The second recessed groove 265 extends vertically between the open front 210 and open back 215 of the housing 205. The turkey call assembly further includes an aluminum slate second striker plate 270 positioned within the second recessed groove 265. The turkey call assembly 200 also includes a third recessed groove 255 located on the top 220 of the housing 205. The third recessed groove 255 extends vertically between the open front 210 and open back 215 of the housing 205 and is positioned parallel to or in a side by side orientation with the first recessed groove 245. The turkey call assembly 200 includes an acrylic slate third striker plate 260 positioned within the third recessed groove 255.

As shown in FIG. 5, the turkey call assembly 200 also includes a striker member 275 having a first section 280 having a proximal end 285 and a distal end 290. The striker member 275 also includes a second section 295 having an upper end 300 and a lower end 305. The proximal end 285 of the first section 280 is attached to the upper end 300 of the second section 295. Wherein the distal end 290 of the striker member 275 is rubbed across the aluminum slate first striker plate 250, the aluminum slate second striker plate 270, and the acrylic slate third striker plate 260, so as to produce at least three different turkey call sounds.

The striker member 275 is preferably constructed from wood, such as cherry wood or walnut wood. However it should be understood that the striker member 275 may be constructed of any desired material, including but not limited to, stone, wood, cherry wood, walnut wood, acrylic, plastics, metals, alloys, non-metals, steel, titanium, carbon fiber, polymers, resins, ceramics composite materials, or combinations thereof. In some embodiments the striker member 275 may be generally elongated and rectangular in shape, while in some embodiments the striker member 275 may be substantially square or may have any other desired shape, as will be appreciated by persons of ordinary skill in the art having the benefit of the instant disclosure. Further, embodiments of the striker member 275 may include reinforcing or bracing structures, such as ribs, struts, braces, rods, or any other suitable reinforcing structure, or combinations thereof.

In some embodiments, the second section 295 of the striker member 275 is tapered. For example, the upper end 300 may be tapered from the lower end 305, so that the upper end 300 is more narrow than the lower end 305. In this way, the second section 295 may be more easily held and used by a person. The striker member 275 may have any desired thickness sufficient to strike or rub the aluminum slate first striker plate 250, the aluminum slate second striker plate 270, and the acrylic slate third striker plate 260 so as to produce three different turkey call sounds. Variations in thickness of the striker member 275 and variations in the material used for the striker member 275 result in the turkey call assembly 200 producing different turkey call sounds. For example, the striker member 275 may be formed from walnut wood, cherry wood, or other suitable materials as will be appreciated by one of ordinary skill in the art having the benefit of the instant disclosure.

In some embodiments, the turkey call assembly 200 includes a pair of striker members 275. Each of the striker members 275 is composed of different types of hardwood, such as walnut and cherry wood, so as to produce a different sound when engaging the aluminum slate first striker plate 250, acrylic slate third striker plate 260, or aluminum slate second striker plate 270. In operation, the housing 205 of the turkey call assembly 200 is held in a user's non-dominant hand, while a striker member 275 is held in the user's dominant hand, so that the striker member 275 is held similarly to a writing utensil.

The striker member 275 can then be drawn towards or rubbed across the aluminum slate first striker plate 250, acrylic slate third striker plate 260, or aluminum slate second striker plate 270. For example, a striker member 275 formed cherry wood can be used with each of the aluminum slate first striker plate 250, aluminum slate second striker plate 270, or acrylic slate third striker plate 260, to produce sounds that mimic turkey sounds, and more specifically, turkey hen sounds. While, a striker member 275 formed from walnut wood can also be used with each of the aluminum slate first striker plate 250, aluminum slate second striker plate 270, or acrylic slate third striker plate 260, to produce different sounds that mimic turkey sounds, and more specifically, turkey hen sounds. In this way, the turkey call device 200 can produce at least six different types of hen sounds.

It is to be appreciated that embodiments of the turkey call device 100 or turkey call assembly 200 may be shipped with the housing 105 and housing 205 fully or partially assembled, or with the turkey call device 100 or turkey call assembly 200 fully or partially disassembled in the form of a kit, as will be readily appreciated by persons of ordinary skill in the art having the benefit of the instant disclosure.

From the above description, it is clear that the inventive concepts disclosed herein are adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the broad scope of the inventive concepts disclosed herein and defined by the appended claims.

What is claimed is:

1. A turkey call device for producing three different turkey call sounds, comprising:
    a housing having an open front, an open back, a top, a bottom, and first and second sides extending therebetween, wherein the housing is tapered from the top of the housing to the bottom of the housing, so that the top of the housing is more narrow than the bottom of the housing;
    a barbell shaped acoustic chamber defining a first passage connected to a second passage connected to a third passage therein, the acoustic chamber positioned within the housing and extending vertically between the open front and open back of the housing;
    a first recessed groove of a first dimension located on the top of the housing and a first striker plate positioned within and supported by the first recessed groove for producing a first turkey call, the first recessed groove extending vertically between the open front and open back of the housing and positioned above the first passage of the acoustic chamber;
    a second recessed groove of a second dimension centrally located on the bottom of the housing and a second striker plate positioned within and supported by the second recessed groove for producing a second turkey call, the second recessed groove extending vertically between the open front and open back of the housing and positioned below the second passage of the acoustic chamber, the second striker plate for producing a long-range locator call having a hearing range up to one half mile so as to eliminate the need for a user to travel long distances for the turkey call device to be heard from afar; and
    a third recessed groove of a third dimension located on the top of the housing and a third striker plate positioned within and supported by the third recessed groove for producing a third turkey call, the third recessed groove extending vertically between the open front and open back of the housing and positioned parallel to and separated from the first recessed groove by a portion of the housing, the third recessed groove positioned above the third passage of the acoustic chamber.

2. The turkey call device of claim 1, further comprising a fourth recessed groove having a fourth dimension located on the top of the housing and a fourth striker plate positioned within and supported by the fourth recessed groove for producing a fourth turkey call, the fourth recessed groove extending vertically between the open front and open back of the housing and positioned parallel to the first and second recessed groove.

3. The turkey call device of claim 1, wherein the first striker plate is formed from acrylic slate.

4. The turkey call device of claim 1, wherein the second striker plate is formed from aluminum slate.

5. The turkey call device of claim 1, wherein the third striker plate is formed from stone slate.

6. The turkey call device of claim 2, wherein the fourth striker plate is formed from wood.

7. The turkey call device of claim 1, wherein the housing is formed from maple wood.

8. The turkey call device of claim 1, wherein the housing is formed from plastic.

9. The turkey call device of claim 1, wherein the housing is formed from metal.

10. A turkey call assembly for producing three different turkey call sounds comprising:
   a housing having an open front, an open back, a top, a bottom, and first and second sides extending therebetween, wherein the housing is tapered from the top of the housing to the bottom of the housing, so that the top of the housing is more narrow than the bottom of the housing;
   a barbell shaped acoustic chamber defining a first passage connected to a second passage connected to a third passage therein, the acoustic chamber positioned within the housing and extending vertically between the open front and open back of the housing;
   a first recessed groove of a first dimension located on the top of the housing and extending vertically between the open front and open back of the housing, the first recessed groove positioned above the first passage of the acoustic chamber, and an aluminum slate first striker plate positioned within and supported by the first recessed groove for producing a first turkey call;
   a second recessed groove of a second dimension centrally located on the bottom of the housing and extending vertically between the open front and open back of the housing and positioned below the second passage of the acoustic chamber, and an aluminum slate second striker plate positioned within and supported by the second recessed groove for producing a second turkey call, the aluminum slate second striker plate for producing a long-range locator call having a hearing range up to one half mile so as to eliminate the need for a user to travel long distances for the turkey call assembly to be heard from afar;
   a third recessed groove of a third dimension located on the top of the housing and extending vertically between the open front and open back of the housing and positioned parallel to and separated from the first recessed groove by a portion of the housing, the third recessed groove positioned above the third passage of the acoustic chamber, and an acrylic slate third striker plate positioned within and supported by the third recessed groove for producing a third turkey call; and
   a striker member having a first section having a proximal end and a distal end and a second section having an upper end and a lower end, the proximal end of the striker member attached to the upper end of the second section;
   wherein the distal end of the striker member is rubbed across the aluminum slate first striker plate, the aluminum slate second striker plate, and the acrylic slate third striker plate, so as to produce three different turkey call sounds.

11. The turkey call assembly of claim 10, wherein the striker member is formed from cherry wood.

12. The turkey call assembly of claim 10, wherein the striker member is formed from walnut wood.

* * * * *